United States Patent [19]

Elser

[11] Patent Number: 5,086,864
[45] Date of Patent: Feb. 11, 1992

[54] HYDRAULIC AUXILIARY-POWER STEERING DEVICE

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 499,399

[22] PCT Filed: Feb. 1, 1989

[86] PCT No.: PCT/EP89/00081

§ 371 Date: Jun. 20, 1990

§ 102(e) Date: Jun. 20, 1990

[87] PCT Pub. No.: WO89/07064

PCT Pub. Date: Aug. 10, 1989

[30] Foreign Application Priority Data

Feb. 4, 1988 [DE] Fed. Rep. of Germany ....... 3803206

[51] Int. Cl.⁵ .................... B62D 5/12; F15B 9/10
[52] U.S. Cl. ..................... 180/147; 180/148; 180/132; 91/401; 92/13.5; 92/13.8
[58] Field of Search ............ 180/132, 146, 147, 148; 92/13.41, 13.5, 13.6, 13.8, 136; 91/375 R, 401

[56] References Cited

U.S. PATENT DOCUMENTS

| 2,912,935 | 12/1955 | Wick et al. | 92/13.8 |
| 4,736,674 | 4/1988 | Stoll | 92/13.5 |
| 4,773,303 | 9/1988 | Stroud | 92/13.5 |

FOREIGN PATENT DOCUMENTS

| 2820567 | 11/1979 | Fed. Rep. of Germany | 180/132 |
| 2028741 | 3/1980 | United Kingdom | 180/132 |
| 2151996 | 7/1985 | United Kingdom | 180/148 |

OTHER PUBLICATIONS

Integral Power Steering Gear Applications Guide.

Primary Examiner—Kenneth R. Rice
Assistant Examiner—Anne Marie Boehler
Attorney, Agent, or Firm—Albert M. Zalkind

[57] ABSTRACT

The invention is concerned with a device that cuts off pressure in the final positions of the steering movement in an auxiliary-power steering device. In steering devices that have movable working pistons in the steering gear housing, this cut-off device is installed in a through drilled hole in the working piston. A by-pass valve that is activated by a push rod touching the wall of the housing is provided for every direction of steering. To avoid time-consuming adjustment work on the by-pass valves the walls contain bushings located opposite the push rods that are automatically pushed into the final positions corresponding to the wheel steering angle after the auxiliary-power steering device is installed in the vehicle. That happens as a result of rotating, first without auxiliary power, against the wheel limit stops, with the front axle jacked up, after the preliminary installation of the bushings in their drilled holes. When that happens, the bushings are pushed in by the working piston to the setting (a) that is provided for cutting off the auxiliary power. Since the push rods of the by-pass valves are larger than the depth (s) of the drilled hole in the bushings by the amount of the setting (a), the auxiliary power is cut off shortly before the wheel limit stops are reached.

5 Claims, 1 Drawing Sheet

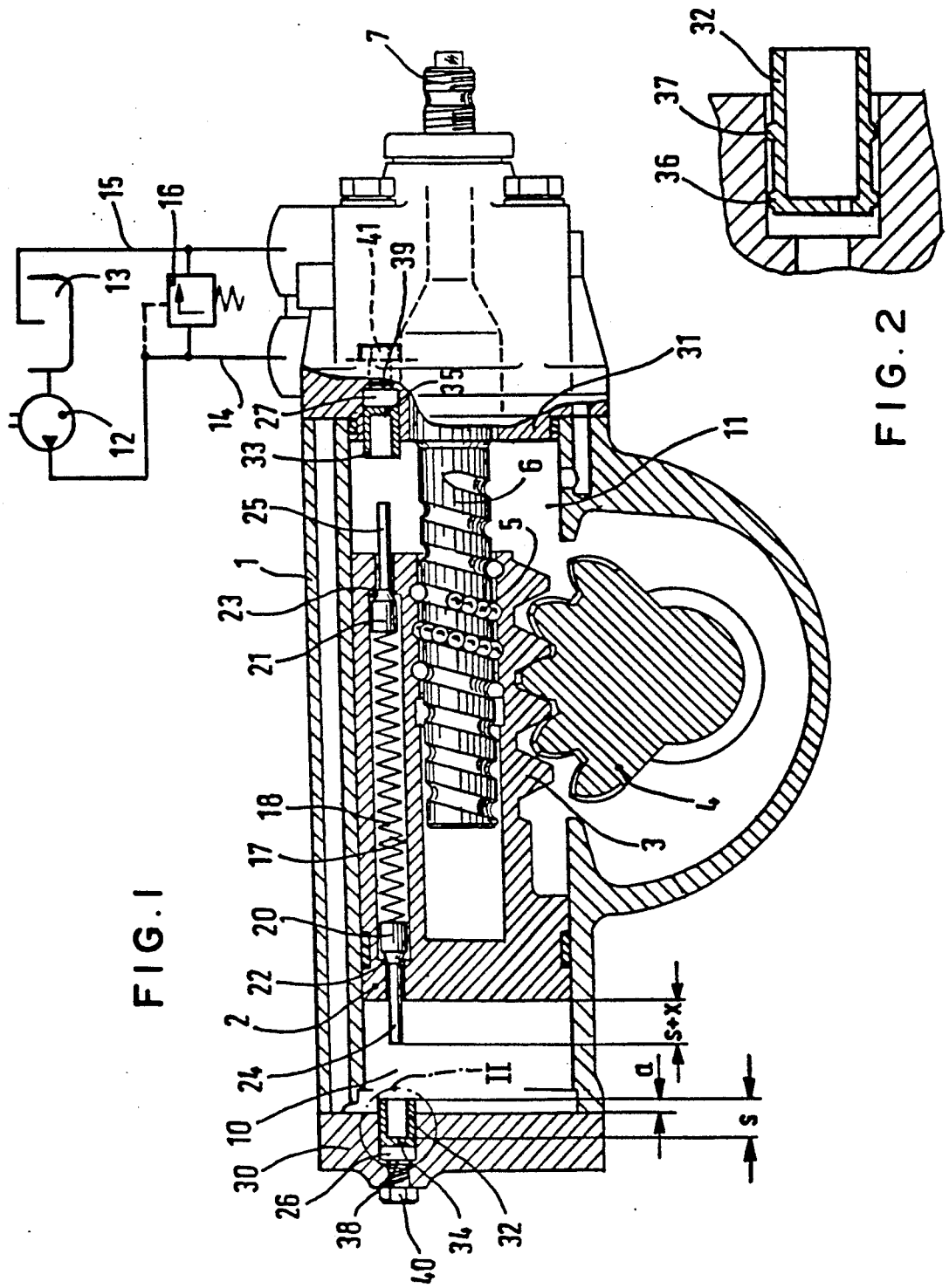

HYDRAULIC AUXILIARY-POWER STEERING DEVICE

The invention is concerned with a hydraulic auxiliary-power steering device.

BRIEF DESCRIPTION OF THE PRIOR ART

Auxiliary-power steering devices with a working or drive piston installed in the steering gear housing are equipped with cut-off devices that cut off the auxiliary power in the surge chamber which is under working pressure at that time, before the limit stops are reached. In that process, seat valves connected with push rods are used which are pressed into their closed position by the combined power of a spring and the working pressure. When the final position of the piston in reached, a push rod abuts a housing wall and the proper by-pass valve opens. The high pressure that is acting in the working chamber is then reduced through a through-drilled hole or bore containing the cut-off device and through the working chamber that is relieved of the pressure. Such cut-off devices are known from DE-PS 25 04 892 and DE-OS 29 30 49B, for example.

From a prospectus of the Ross Gear Division, TRW Steering Components Group, 8000 Heath St., Lafayette, Ind. 47902, U.S.A., entitled "Integral Power Steering Gear—Applications Guide," from 1987, it is apparent that manual adjustment of the by-pass valve in the final positions of the steering movement are no longer performed during the initial assembling process. Instead, the by-pass valves are adjusted automatically after the assembly of the steering mechanism in the vehicle by a single mechanical rotation against the wheel limit stops. According to the prospectus, the steering limiter is constructed in such a way that a bushing or seat is pressed into an outer bushing or sleeve. The outer bushing is seated firmly in an axial through-drilled hole in the working piston. The inner bushing projects far beyond the outer bushing and the working piston after the assembly of the steering mechanism. Upon mechanical rotation against the wheel limit stops, the inner bushing touches a radial housing wall early and is pushed to the required setting in the through-drilled hole.

The inner bushing comprises the seat for the by-pass valve, whose piston is spring-loaded. A push rod of the cut-off piston directed outwardly projects from the working piston by a few millimeters so that the hydraulic pressure is reduced as soon as the push rod comes into contact with the radial housing wall.

In this known automatically adjustable steering limiter, the fit between the outer and the inner bushings must be produced with very great precision. With even small variations, the possibility of endangering the steering function, and thereby the safety of travel, cannot be excluded. Specifically, if the pressing of the two bushings is too slight, the inner bushing can creep outward axially as a result of the operating pressure. The operating pressure acts through the surge chamber, which is under operating pressure, and the by-pass valve in the working piston adjoining that surge chamber in the inside of the through drilled hole, and by that means it also acts on the by-pass valve that is under operating pressure.

Furthermore, the danger of the "creeping" outward of the inner bushing is increased by the fact that the working pressure, when traveling over obstacles, can achieve for a brief period of time an increase of more than 50 percent of the maximum pressure adjusted by a pressure limitation valve, as a result of the oil's mass moment of inertia.

SUMMARY OF THE INVENTION

Therefore it is the object of the invention to provide a self-adjusting hydraulic steering limiter with which a satisfactory cut-off function is assured under all operating conditions.

According to the invention, bushings are provided as a limit stop for the push rod of the by-pass valve in the radial walls of the housing to limit the piston travel.

In that situation, the open side of the bushing is turned toward the push rod. This shortens the axial space requirement. The vehicle is jacked up for assembly and adjustment of the auxiliary-power steering device. Therefore the steering gear and the steered wheels can easily be activated by hand—that is, without auxiliary power. The by-pass valves are adjusted by forcing the bushings with the working pistons to the suitable distance in the proper drilled hole in the wall when the steering wheel is rotated against the wheel limit stops. The bushings can be relieved of pressure through small drilled holes in their bottom. This has the advantage that uniformity of pressure prevails on both sides, and therefore no hydraulic adjusting forces act upon the bushings. If it should happen that the holding forces of the bushing in the drilled hole through tolerance variations are too slight, the hydraulically supported stroke of the working pistons, and consequently the steering movement, become larger. Such a conception is a great deal safer than a reduction of the hydraulically supported steering movement. For better adhesion of the bushings in their drilled holes, tori are provided on the bushings. Furthermore, it is advantageous to make the location holes of the bushings accessible from outside. In that way, the bushings can be pushed farther out of their drilled holes and adjusted once again by rotating against the limit stops when the steering mechanism is removed later and installed again in another vehicle.

BRIEF DESCRIPTION OF THE FIGURES

FIG. 1 in the drawings shows a simplified embodiment of an auxiliary power steering device in cross section with the self-adjusting by-pass valves according to the invention.

FIG. 2 shows an enlarged cutaway portion of FIG. 1.

DETAILED DESCRIPTION

The auxiliary-power steering device comprises a steering gear housing 1 that is a cylinder and in which a working or drive piston 2 can move. The working piston 2 engages a steering worm sector shaft 4 with a gear-tooth system 3. Furthermore, the working piston 2 serving simultaneously as a steering nut engages with a steering worm 6 through a bead chain 5. The steering worm 6 is connected with a steering shaft 7. There are surge chambers 20 and 11 on both sides of the working piston 2. A high-pressure pump 12 supplies pressure oil from a tank 13 through a pressure duct 14 to a steering valve (not shown) capable of being triggered by the rotation of the steering shaft. In the neutral position of the steering valve, the pressure oil flows off through a return duct 15 to the tank 13. A pressure relief valve 16 is located between the pressure duct 14 and the return duct 15.

The working piston 2 contains two cut-off pistons 20 and 21 in a through-drilled hole or bore 17 parallel to the axis. A weak spring 18 pushes the cut-off pistons 20 and 21 in their starting position against seats 22 and 23. Each piston 20 and 21 has a push rod 24 and 25.

According to the invention, bushings 32 and 33 are pushed into drilled holes 26 and 27 in the walls 30 and 31 running radially to the steering worm 6. The open side of the bushings 32 and 33 is turned toward the push rods 24 and 25, so that the rods can plunge into the bushings when the working piston 2 is displaced. The bushings 32 and 33 are relieved of the working pressure by small drilled holes 34 and 35.

To improve the adhesion, tori 36, 37 can be provided on the bushings 32, 33 in accordance with FIG. 2. The radial overmeasure can be increased by these tori 36, 37 when there are equal forces pressing inward. In this way, the diameter tolerances can be greater when there is equally good axial fastening security.

When assembling the steering device, the bushings 32 and 33 are first pressed only slightly into their drilled holes 26 and 27. To adjust the bushings 32, 33, a turn is made against the two wheel limit stops so that the working piston 2 pushes the bushings farther into the drilled holes 26 and 27. When that is done, the pressing-in setting (a) is adjusted automatically. Since the push rods 24 and 25 project x millimeters farther out of the working piston 2 than the depth s of the drilled holes inside the bushings 32 and 33, the hydraulic power inside the setting x is cut off in normal steering operation before the wheel limit stop is reached. That means that, for example, when the working piston 2 is moved to the left, the cut-off piston 20, which is pushed up by the push rod 24, connects the surge chamber 11 that is under working pressure with the surge chamber 10 that is relieved of pressure by the cut-off piston 21, which is already opening under low pressure, and the through-drilled hole 17.

There are special cases where an auxiliary-power steering device with a low cost of installation ought to be removed from one vehicle and installed again in another vehicle. In order that the steering device does not have to be disassembled to readjust the by-pass valves, drilled holes 38, 39 are provided through which a tool can be introduced to push the bushings 32, 33 back. In this way, the bushings can be adjusted again in the new vehicle in the manner that has already been described. Bolts 40 and 41 keep dirt from penetrating.

I claim:

1. In a hydraulic auxiliary-power steering mechanism for motor vehicles including a housing (1) having walls and containing a threaded spindle upon which a drive piston (4) is movable, a steering valve for supplying pressurized oil to working chambers (10, 11) of the housing on opposite sides of the drive piston, steering limiting bypass valves (20, 21) arranged within an axial bore of the drive piston, the bypass vales each including a push rod (24, 25) which projects from opposite ends of the drive piston, the bypass valves being activated when the push rods engage the walls of the housing and being automatically adjusted to limit the travel of the drive piston during assembly of the mechanism as a result of rotation of the motor vehicle steering wheel from limit stop to limit stop, the improvement wherein said housing walls contain openings aligned with the push rods of said bypass valves, and further comprising self-adjusting bushings arranged within said openings, an insertion position (a) of said bushings being set by the drive piston upon movement of the drive piston between its terminal positions defined by rotation of the steering wheel from limit stop to limit stop.

2. A hydraulic auxiliary-power steering mechanism as defined in claim 1, wherein said bushings contain openings which face the push rods.

3. A hydraulic auxiliary-power steering mechanism as defined in claim 1, wherein said housing wall openings include threaded bores (26, 27) accessible to the exterior of the housing, and further comprising bolts (40, 41) for closing said threaded bores.

4. In a hydraulic auxiliary-power steering mechanism for motor vehicles including a housing (1) having walls and containing a threaded spindle upon which a drive piston (4) is movable, a steering valve for supplying pressurized oil to working chambers (10, 11) of the housing on opposite sides of the drive piston, steering limiting bypass valves (20, 21) arranged within an axial bore of the drive piston, the bypass valves each including a push rod (24, 25) which projects from opposite ends of the drive piston, the bypass valves being activated when the push rods engage the walls of the housing and being automatically adjusted to limit the travel of the drive piston during assembly of the mechanism as a result of rotation of the motor vehicle steering wheel from limit stop to limit stop, the improvement wherein said housing walls contain openings aligned with the push rods of said bypass valves, and further comprising self-adjusting bushings arranged within said wall openings and containing openings which face said push rods, said bushings having a bottom wall containing a small drilled bore (34, 35) for relieving pressure, an insertion position (a) of said bushings being set by the drive piston upon movement of the drive piston between its terminal positions defined by rotation of the steering wheel from limit stop to limit stop.

5. A hydraulic auxiliary-power steering mechanism as defined in claim 4, wherein each bushing includes at least one outer torus (36, 37) having a slightly larger diameter than said bushing.

* * * * *